3,001,276
WELDING FLUX AND METHOD OF USING
Stuart G. McGriff, Gibsonia, Pa., assignor to Callery Chemical Company, Pittsburgh, Pa., a corporation of Pennsylvania
No Drawing. Filed May 12, 1955, Ser. No. 507,991
2 Claims. (Cl. 29—495)

This invention relates to a new process of welding using an improved welding flux and more particularly it relates to a method of welding which involves the use of trimethoxyboroxine, $B_3O_3(OCH_3)_3$, or a solution of trimethyl borate or boric oxide in trimethoxyboroxine as a versatile welding flux.

Throughout the history of the welding art, the most common fluxing base has been a solid material or solutions which on heating leave solid residues. Generally, these materials or solutions contain boron in the form of boric oxide, $B_2O_3$, or a boron salt such as borax, $Na_2B_4O_7 \cdot 10H_2O$. Boron compounds are especially adapted for this use because they fuse readily with most metal oxides. However, there are many drawbacks to solid fluxes, the most serious of which are their low volatility and the tendency for powdered fluxes to scatter under the gas pressure of the welding torch. These difficulties have been partially overcome by using liquid organic boron compounds such as trimethyl borate which are readily vaporized.

The patent literature is replete with various materials which have been used as welding fluxes. In 1939, U.S. Patent 2,181,094 utilized lithium compounds which when heated in the presence of carbon monoxide liberated free metallic lithium. From a commercial viewpoint, the process was not feasible because lithium compounds are relatively scarce and expensive. In 1940, Vaughn et al. were granted United States Patent 2,211,448 in which they used an alkyl borate such as trimethyl borate alone or in solution with an alcohol as a volatile welding flux. This process of carrying flux by vapor phase entrainment to the welding zone was not completely satisfactory due to the differential volatilization of the borate-alcohol mixtures used and the fact that the volatility of the borates alone was difficult to control. In 1942, Bialosky et al. obtained United States Patent 2,277,064 in which they added various solvents such as volatile organic halides to borate-alcohol mixtures in order to obtain uniform fluxing properties. In 1953, Schechter was granted United States Patent 2,629,732 on an ammonia-methyl borate compound having the formula $NH_3(OCH_3)_3$ which is a crystalline solid suitable for use as a flux in gas welding operations.

In all these prior art processes utilizing a volatile borate type of flux, the mode of operation is identical—i.e., the alkyl borate is oxidized by combustion in the torch flame to form boric oxide, which serves as the welding flux. A solid flux may be applied directly to the workpiece or the workpiece may be dipped from time to time into a supply of flux. Such fluxes usually leave a residue which must be removed and since the flux is in a fused state that is generally difficult to do. The time required to apply and remove the flux is substantially increased which likewise increases the cost of the entire operation. In order to decrease the time required for a gas welding operation, liquid fluxes which can be fed directly into the gas stream going to the torch have been tried. Most of these liquids must be dissolved in a suitable solvent and cooled or heated before the proper amount of boric oxide is formed in the welding zone to be practical as a flux. The use of solvents presents other difficulties such as differential volatility. It would therefore be desirable if a liquid flux could be made available which would require no solvent and which when burned would supply the proper amount of boron to the welding zone so that uniform fluxing properties could be obtained.

It is an object of this invention to provide a new process of welding using an improved welding flux which is economical and convenient to use.

Another object is to provide a method of welding which utilizes a liquid boron containing material that can be easily entrained in the gas stream supplied to a welding torch to provide the requisite amount of boric oxide which serves as a welding flux.

A still further object is to provide a method of welding which uses an improved welding flux that requires no solvent and contains more boron per mol than any boron compound previously used.

Other objects will become apparent throughout the specification and appended claims.

This improved welding flux and method of using same will be more fully described hereinafter and the novelty will be particularly pointed out and distinctly claimed.

This invention is based upon the discovery that trimethoxyboroxine or a solution of boric oxide and trimethyl borate can be used directly as such in the gas stream of a welding torch so that it is carried to the flame and burned to form boric oxide which serves as a welding flux. The advantages of this type of flux are: (1) it can be produced more cheaply than trimethyl borate (2) it contains more boron per mol than trimethyl borate (3) it contains less methoxy groups than trimethyl borate and thus produces a hotter flame (4) it has a lower vapor pressure than trimethyl borate but the higher boron content compensates for this (5) no solvent is required which circumvents the differential solubility problem encountered in solutions which have been used in the past.

Trimethoxyboroxine can be conveniently prepared by refluxing a mixture of boric oxide with a stoichiometric excess of trimethyl borate for 13 hours or more. The excess trimethyl borate is then distilled off and the reactor is cooled. The product which is a turbid viscous liquid is transferred to a separating funnel and allowed to stand until the turbidity clears up leaving a grey sludge and a water clear liquid. This liquid has a boron content of 16.8 milligram atoms per gram compared to the theoretical boron content for trimethoxyboroxine of 17.2 milligram atoms per gram. Thus, the purity is 97.5%.

In order to test the usefulness of trimethoxyboroxine as a welding flux, several pieces of brass were soldered together using silver solder. The boric oxide flux was applied to the brass by bubbling the torch gas supply through the trimethoxyboroxine. The torch burned with a brilliant green flame and the boric oxide deposited as a water-clear glass. This self fluxing flame protected the brass surface so that when the joint was made the work was cleaner than new. This and other tests show that the self fluxing flame will do as good a job as brush applied flux if the workpiece is clean. The tests also showed that solder will not flow into a clean joint unless some kind of flux is present. Furthermore, the boron flame flux method is of greater value than the brush method in cases where the time consumed in brushing on the flux is an important factor such as in assembly line operation.

The trimethoxyboroxine can be applied to the workpiece by brushing, atomizing in a fine spray or by dipping the workpiece in liquid trimethyl borate-boric oxide solutions with equally good results.

The term trimethoxyboroxine as used herein refers to the compound having the formula $B_3O_3(OCH_3)_3$ as well as to solutions of boric oxide or trimethyl borate in $B_3O_3(OCH_3)_3$. Trimethoxyboroxine and boric oxide or methyl borate solutions in trimethoxyboroxine are believed to be a series of loose polymeric compounds whose physical properties and degree of polymerization are a function of the relative amounts of methyl borate and boric oxide in the composition.

Having thus described this invention and the best mode contemplated for practicing the same as required by the patent statutes, I desire to have it understood that within the scope of the appended claims, this invetnion may be practiced otherwise than as specifically described.

What I claim is:

1. In a method of gas welding metals, the step which comprises supplying trimethoxyboroxine to one of the welding gases and burning the trimethoxyboroxine with the welding gases in the welding zone to produce a boric oxide flux.

2. In a method of gas welding metals, the step which comprises bubbling one of the welding gases through trimethoxyboroxine whereby trimethoxyboroxine is entrained in the welding gas and burning the trimethoxyboroxine with the welding gases in the welding zone to produce a boric oxide flux.

References Cited in the file of this patent

UNITED STATES PATENTS

| | | |
|---|---|---|
| 1,741,031 | Miller | Dec. 24, 1929 |
| 2,123,455 | Thomas | July 12, 1938 |
| 2,262,187 | Lytle et al. | Nov. 11, 1941 |
| 2,787,329 | Schechter | Apr. 2, 1957 |